United States Patent [19]

Ditzik

[11] Patent Number: 4,911,536
[45] Date of Patent: Mar. 27, 1990

[54] INTERACTIVE GRAPHIC COMUNICATIONS TERMINAL

[76] Inventor: Richard J. Ditzik, 3143 Carnegie Ct., San Diego, Calif. 92122

[21] Appl. No.: 203,948

[22] Filed: Jun. 8, 1988

Related U.S. Application Data

[63] Continuation-in-part of Ser. No. 860,824, May 8, 1986.

[51] Int. Cl.[4] .............................................. G02F 1/13
[52] U.S. Cl. ..................... 350/351; 350/334; 350/332; 350/345; 340/713; 340/784
[58] Field of Search .................. 350/351, 330, 331 R, 350/334, 350 S, 342, 333, 332, 345; 340/713, 784

[56] References Cited

U.S. PATENT DOCUMENTS

| | | | |
|---|---|---|---|
| 3,524,998 | 8/1970 | Gilbert | 307/299 |
| 3,650,608 | 3/1972 | Baker | 350/331 R |
| 3,720,784 | 3/1973 | Maydan et al. | 178/6.6 R |
| 3,775,757 | 11/1973 | Taylor et al. | 340/173 LS |
| 3,796,999 | 3/1974 | Kahn | 340/173 R |
| 3,941,927 | 3/1976 | Russell | 178/7.6 |
| 3,994,567 | 11/1976 | Matsuo et al. | 350/332 |
| 4,110,794 | 8/1978 | Lester et al. | 350/331 R X |
| 4,194,833 | 3/1980 | Lester et al. | 350/331 R |
| 4,236,784 | 12/1980 | Palmer | 350/96.20 |
| 4,422,732 | 12/1983 | Ditzik | 350/356 |
| 4,464,020 | 8/1984 | Le Berre et al. | 350/350 S |
| 4,499,458 | 2/1985 | Le Berre et al. | 340/333 X |
| 4,525,032 | 6/1985 | Hilsum | 350/331 R |
| 4,568,080 | 2/1986 | Yokoi | 340/784 |
| 4,649,517 | 3/1987 | Kitazima et al. | 350/333 X |
| 4,662,720 | 5/1987 | Fergason | 350/334 X |
| 4,688,901 | 8/1987 | Albert | 350/350 S |
| 4,723,836 | 2/1988 | Kono et al. | 350/331 R |
| 4,765,719 | 8/1988 | Fergason | 350/350 S |

FOREIGN PATENT DOCUMENTS

| | | | |
|---|---|---|---|
| 7217274 | 1/1973 | France | 350/331 R |
| 0007339 | 1/1984 | Japan | 340/765 |
| 1133757 | 11/1968 | United Kingdom | |

OTHER PUBLICATIONS

D. L. White and M. Feldman, "Liquid Crystal Light Valves", Electronic Letters, vol. 6, No. 26, Dec. 31, 1970, pp. 837-839.

J. F. Stephany and I. P. Gates, "Liquid Crystal Keyboard", Xerox Disclosure Journal, vol. 5, No. 5, Sep.-/Oct. 1980, p. 559.

R. C. Tsai, "High Data Density Four-Color Liquid Crystal Display", Optical Engineering, vol. 21, No. 3, May/Jun. 1982, pp. 565-568.

"Removable Liquid Crystal Display for a Personal Computer", IBM Technical Disclosure Bulletin, vol. 29, No. 10, Mar. 1987.

(List continued on next page.)

Primary Examiner—Stanley D. Miller
Assistant Examiner—Huy K. Mai

[57] ABSTRACT

An interactive electro-optic display device used in combination with a transparent graphics tablet device providing an electronic writing surface for an integrated display-tablet operation. A person using the system can hand sketch, write, and draw onto an electronic writing surface, and the system converts this information to electrical signals for display on a viewing screen directly under the transparent graphic tablet. Hand written information from the tablet and alphanumeric information from a keyboard can be transmitted external to the display-tablet unit, and the unit is capable of receiving externally generated data for presentation on the display panel. The invention can be used as a computer-based communications terminal for two-way graphic and voice data. The disclosed display device is a direct view optical beam addressed electrooptic display device, having one or more laser sources, an optical beam deflector, an electrooptic display panel, and control electronics. The graphic tablet and keyboard are electrically connected to the control electronics for an integrated operation. A folded optical path design results in an inclined writing surface and display screen combination, which provide the advantages of improved man-machine interaction and display readability.

20 Claims, 2 Drawing Sheets

OTHER PUBLICATIONS

Suva, "Graphics/Voice Communication"—Suva Technologies TM 100 Screen Writer Product; Suva Corporation, 1985.

Davis et al., "The Rand Tablet—A Man-Machine Graphical Communication Device", *Proc. Fall Joint Computer Conference*, 1964.

A. G. Dewey et al., "A 2000 Character Thermally-Addressed Liquid Crystal Projection Display"; SID Conf. Digest, 1977, pp. 108–109.

Proceedings-Fall Joint Computer Conference M. R. Davis and T. O. Ellis, 1964.

Society of Information Display Digest, A. R. Kmetz, 1972.

Proceedings of the IEEE, B. Lechner, F. Marlow, E. Nester, and J. Tults, vol. 59, No. 11, Nov. 1971.

IBM Technical Disclosure Bulletin, M. I. Davis, M. J. Garrett, D. H. Kirkman, and J. A. Wisman, vol. 25, No. 11B, Apr. 1983.

Optical Engineering, R. E. Hopkins and M. J. Buzawa, vol. 15, No. 2, 1976.

Milles Griot Optical Systems, Product Literature, C. 1984.

Applied Physics Letters, F. Kahn, vol. 22, No. 3; 1, Feb. 1973.

Applied Physics Letters, L. Samuelson, H. Wieder, C. R. Guarnieri, J. Chevallier, and A. Onton, vol. 34, No. 7, Apr. 1979.

Applied Physics Letters, N. A. Clark and Sven Lagerwall, vol. 36, No. 11, Jun. 1980.

Suva Telegraphics 100 Screen Writer; Product Litature Suva Corporation, San Jose, California; No Date.

Patent Disclosure 0007339, Japan; Tatsuzou Hamada, "Liquid Crystal Display Device", 1-14-84.

U.S. Patent 4,568,080 G. Yokoi, "Display Apparatus" Filed May 2, 1983.

Robert C. Tsai, *Optical Engineering*, vol. 21 No. 3 May/June 1982.

Patent Europe (France) 72.17274; George Elliott; Jan. 1973.

D. L. White, M. Feidman, "Liquid-Crystal Light Valves"*Electric Letters*, vol. 6, No. 26, Dec. 1970.

A. Dewey, J. Jacobs, B. Huth, G. Sincerbox, G. Sprokel, A. Juliana, & R. Koepcke; SID International Symposium, Digest of Papers, Apr. 17-21, 1977.

J. F. Stephany, I. P. Gates; *Xerox Disclosure Journal*; Liquid Crystal Keyboard, Sep./Oct. 1980.

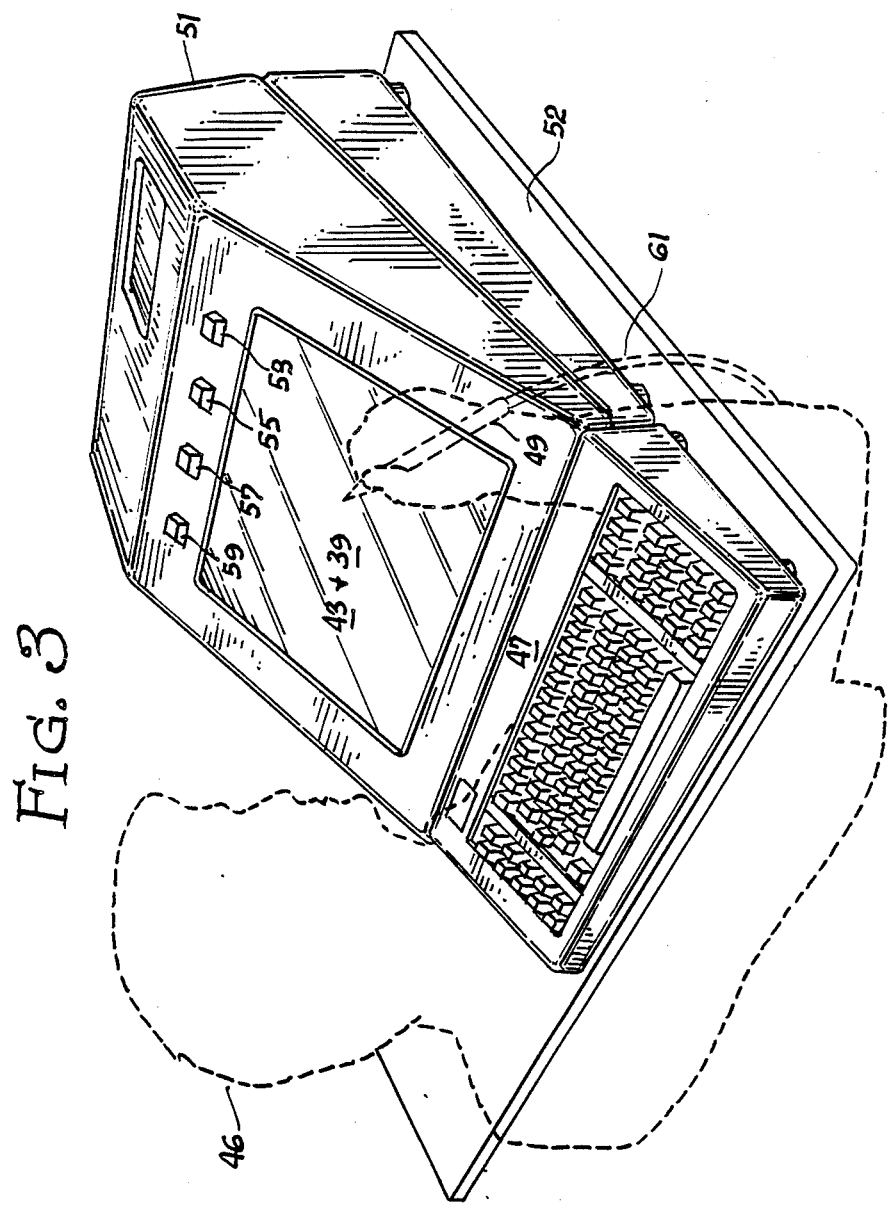

INTERACTIVE GRAPHIC COMUNICATIONS TERMINAL

CROSS REFERENCE TO A RELATED APPLICATION

This is a Continuation In Part of Application #06/860,824 filed on 5/8/86.

BACKGROUND OF THE INVENTION

1. Field of the Invention

This invention relates to computer peripheral data communications equipment. In particular, it relates to computer terminals and/or man-machine interfaces, used by individuals to communicate text and graphic information.

2. Description of Prior Art

Prior art in the field generally involves computer terminal units where conventional display devices are electrically connected to a graphic tablet or touch panel device. A display device is defined as an electrical and-/or optical device capable of visually presenting alphanumeric, line graphic, or pictorial information onto a viewing screen. A display panel is a component of some display devices, which consists of an electrooptic material sandwiched or placed between two substrates, on which the visual information is written by electrical or optical means. An electrooptic material is a homogeneous material which changes optical state when an electrical field and/or light beam is applied. Generally, display devices can be classified as either a direct view or indirect view display. Henceforth, in this specification, a direct view display will mean that the display panel of the device is also the display screen, and the screen is large enough to be viewed by a person. An indirect view display is a display device where the display panel is separate from the screen, and the visual information is first placed onto a small display panel and then optically projected onto a larger screen.

Most display device prior art involve the well known cathode ray tube (CRT) or the flat panel display technologies. Examples of the flat panel display technologies include the electrooptic panels, plasma panels and electroluminescent displays. The flat panel displays are addressed, i.e., a point or small area of the panel is selected to be written or erased, by either a conductor matrix means or a light beam means. An electrooptic material is capable of changing optical state from electrical stimulus. Most common electrooptical materials are liquid crystal (LC), electrophoretic and electrochromic materials. These displays are usually matrix addressed. Examples of light beam addressed displays include laser and light emitting diode sources which optically address various flat panels cells or display screens.

The most prevalent high information content display is the conventional CRT display, as used in standard television. Nevertheless, the CRT display has several disadvantages well known to those in the field These disadvantages are important especially when used in desk top computer terminal applications. Disadvantages of the CRT display include: (1) the CRT usually has a long neck resulting in a bulky display device; (2) the CRT requires large operating voltages; (3) the CRT resolution is limited to focusing of its electron beam; (4) the CRT display screen is not flat but curved, usually in a spherical shape; (5) the CRT emits an electromagnetic radiation; and (6) the display does not have inherent memory and must be constantly refreshed.

The most common electrooptic materials used in displays are LC materials, and most of these LC Displays (LCD) are the matrix addressed type. Matrix addressed display panels are those that have a matrix of orthogonally cross conductors serving as the electrodes, forming an array of display cells. Prior art in matrix addressed LCD panels include the disclosures: U.S. Pat. No. 3,994,567 of Matsuo, Toida and Tsunoda, 1976; A. R. Kmetz, S.I.D. Digest, 1972; and B. Lechner, F. Marlow, E. Nester and J. Tults, Proceeding of the IEEE, Vol. 59 No. 11, November 1971. However, matrix addressed electrooptic displays suffer from several disadvantages, especially for large display sizes. First, they are difficult to fabricate because of the large number of wires that must be connected to the panel. For a matrix display equivalent to a television picture, approximately 600 connections must be made to the panel. Secondly, complex multiplexing electronics must drive each panel row and column conductor, adding to the cost. Thirdly, the lack of a sharp optical threshold in electrooptic materials limits the number of picture elements that can be written and the rate at which they can be refreshed. Finally, matrix displays have practical limits in the number of picture elements per panel and in display resolution due to fabrication techniques. The highest resolution matrix display possible with conventional manufacture techniques is about 400×400 picture elements, which is too low for most display applications.

For high resolution display applications having a large number of picture elements, an optical beam addressed electrooptic display device is desired. This is the type of display that is of primary interest in this specification. Prior art in optical beam addressed electrooptic displays include U.S. Pat. No. 4,422,732 of Ditzik granted Dec. 27, 1983, which disclosed a beam addressed electrooptic display system that is scanned by a moving optical fiber element, where the optical beam is cross-sectionally shaped. This prior art display system has some limitations which have been substantially improved by the inventions specified herein. Improvements over this prior art consist of: (1) the addition of a graphic tablet device for man-machine interaction; (2) the use of a flat field projection lens for improved beam focusing; (3) the elimination of several electrooptical components; and (4) a simplified folded optics design.

Other prior art in beam addressed electrooptic displays include U.S. Pat. No. 3,775,757 of Taylor and Ferguson, U.S. Pat. No. 3,720,784 of Maydon and Cohen and U.S. Pat. No. 3,796,999 of Kahn. Each of these used an LCD panel onto which data is written by a low power laser beam. However, this prior art suffers from several disadvantages which has prevented them from being manufactured and marketed successfully. These display systems are indirect view systems requiring independent writing and readout optics. Such display systems require a high intensity lamp, expensive projection optics, and a separate viewing screen. In each of these prior art systems the display panel is small (1-2 inches square); so direct viewing of the panel is not possible. Another disadvantage of an indirect view display is that room ambient lighting must be reduced in order to obtain acceptable screen contrast.

Prior art in graphic tablets have been limited to separate opaque tablets used for scientific or computer-aided design applications. The limitations of these opaque tablets are obvious; they cannot provide an interactive electronic writing surface, because the user must continually look up from the tablet writing surface to the display screen. A graphic tablet can be defined as a device comprised of an electronic writing surface on which a person can position a hand-held stylus, and the position where the stylus touches is measured in two dimensions (x and y). The measured position is converted into an electrical digital code (i.e., encoded) in a conventional manner. The stylus may be a pen or any narrow object or instrument. As one moves the stylus, tracing a path over the writing surface, a continuous digital data stream is output to a display device or other devices. The stylus tracings can be viewed on the display device as graphic information. The design and operation of the graphic tablet input device is known to those practiced in the art; e.g., reference U.S. Pat. No. 3,524,998 of Gilbert; United Kingdom Patent 1,133,757 of Ellis; and M. R. Davis and T. O. Ellis (Proceedings—Fall Joint Computer Conference, 1964).

There is little prior art in the use of display devices in combination with a graphic tablet. A graphic tablet integrated with a display device and operated in combination is henceforth referred to as a display-tablet system. Davis, Garrett, Kirkman and Wiseman disclosed an interactive display tablet that uses a miniature electrochromic or LCD panel which is projected onto the rear of an inclined screen surface (IBM Technical Disclosure Bulletin, Vol. 25, No. 118, April 1983). However, the disadvantages of this disclosure are: (1) the display requires a high intensity lamp and optics for information read-out of the miniature panel, (2) two mirrors are required to fold the optics; (3) the screen is limited to small sizes due to the geometry of the optics required.

BRIEF SUMMARY OF THE INVENTION

Accordingly an object of my invention is to provide an electronic writing surface, wherein a transparent graphic input tablet device is electrically and physically integrated with a display device in such a manner that handwritten or sketched information on the tablet writing surface is converted to an electrical control signal and is sent to the display for viewing on the screen directly under the transparent tablet surface.

Another object of the invention is a high resolution direct view optical beam addressed electrooptical display device having a greatly improved image quality and an inclined display screen, capable of selective alphanumeric/graphic write, selective data erase and bulk (whole screen) erase functions.

A further object of the invention is a laser beam addressed display where the laser beam may be cross-sectionally shaped into alphanumeric characters, the beam may be deflected by a high frequency scanner, and a flat field lens system focuses the beam onto an image screen, which is also the display panel's rear surface.

A further object is an interactive display-tablet communications terminal system including a means of information display, a graphic tablet/stylus means, and a computer keyboard, all working in concert to provide a computer-based communications terminal, capable of transmitting, receiving and echoing (to its own display) alphanumeric and graphic information.

A still further object of the invention is an integrated interactive display-tablet communications terminal in combination with a two-way voice communication means.

A further object of the invention is an electrooptic display panel made with a liquid crystal material, which could be a smectic liquid crystal type, a field effect liquid crystal material, or a combination thereof which may be optically addressed with a photoconductor coating on the surface of one display panel substrate.

A still further object of the invention is to provide an interactive data terminal for office automation, word processing, office facsimile, scientific/engineering, desk top computers and/or personal computer applications.

A further object of the invention is an interactive display-tablet terminal or workstation for inter-office communication, teleconferencing, and/or person to person graphic communications applications.

Another object of the invention is a low cost display system resulting from simple construction and display panel addressing design.

A further object of the invention is the low profile display unit enclosure with the display screen placed at a convenient inclined angle for improved human readability and writing surface interaction.

A still further object of the invention is a small compact unit suitable for portable products such as portable personal computers or portable terminals/workstations.

Another object of the invention is a high contrast display, viewable in a wide range of ambient lighting conditions.

A still further object of the invention is a display having low power operation with relatively low voltage requirements.

BRIEF DESCRIPTION OF THE DRAWINGS

FIG. 3 depicts a perspective view of the invention showing an interactive display-tablet system operation with a person writing or sketching on the electronic writing surface of the graphic tablet with a stylus.

DETAILED DESCRIPTION OF DRAWINGS

Figure 1:
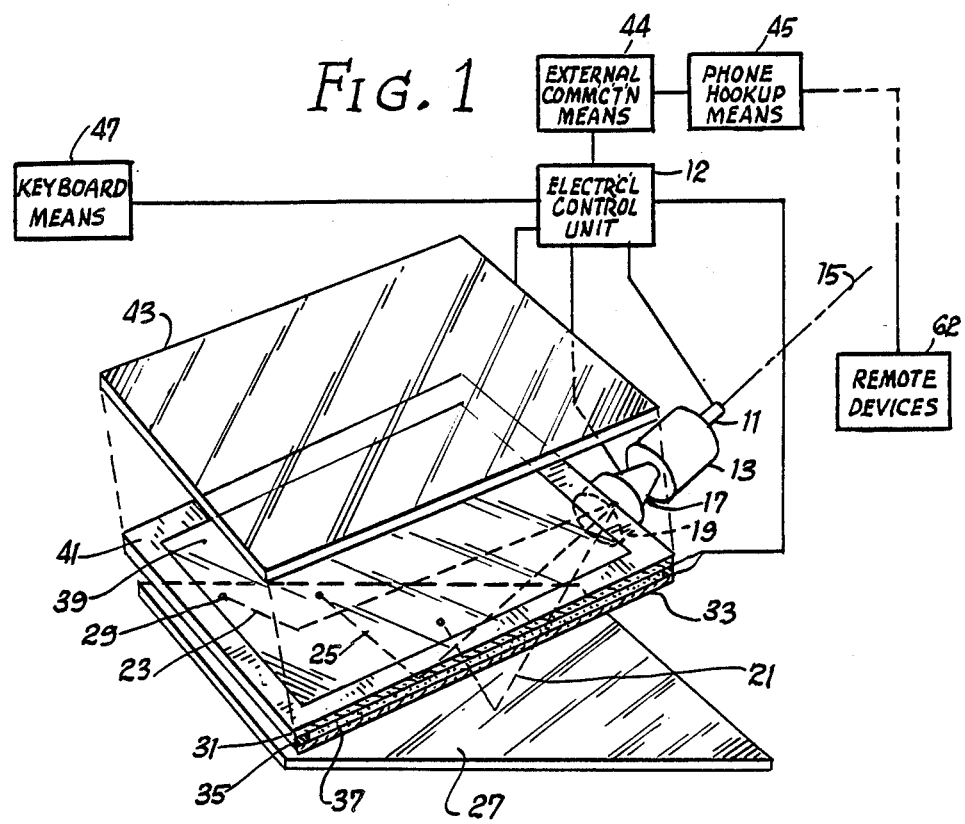
FIG. 1 is a perspective view of the electrical and optical elements of the display-tablet invention, showing the graphic tablet component in an exploded view from the display panel screen.

An illustrated embodiment of the invention is schematically represented in FIG. 1, which is not to scale, . The operation of the display portion of the invention begins with a small optical beam source or laser assembly 11. The type of laser used in the assembly could be a semiconductor laser diode or an equivalent type laser generating an optical beam. The laser assembly 11 may include several lasers in an array, where the array is designed to either produce a single optical beam or multiple beams. The laser assembly may also include a means for collimating the diverging or asymmetric optical beam generated by the laser or laser array. The operation of the source or assembly is controlled (and electrically powered) by an electrical control unit 12. The optical beam is fixed along the optical path 15, which is oriented roughly on downward slope at an oblique angle to the horizontal. The optical beam from the laser source will enter an optical beam shaping character generator 13. In this specification, the term light beam or optical beam is understood to mean an elongated column of optical energy. Optical energy is a quantum of electromagnetic energy generally having a wavelength between approximately 120 and 1,600 nanometers. Semiconductor diode lasers such as those made with GaAlA are available which emit an optical beam with an output power ranging from 1 to 75 mw and having wavelengths from 750 to 850 nm. The advantages of these light sources include their small size, inexpensive power supply requirements, and ease of modulation.

The optical beam shaping character generator 13 is an optional component in this invention. The generator cross-sectionally shapes an optical beam into alphanumeric characters, reference U.S. Patent of Ditzik, 1983. The next element after the character generator on the optical axis is an optical beam deflector 17, which is controlled by an electrical control means 12. An optical beam deflector is a device that dynamically changes the direction of a light beam at high rates, under control of an electrical signal. Several different types of optical beam deflectors could be used, including a galvanometer-mirror, rotating polygon mirror, acoustic-optic, electro-optical crystal, or moving fiber deflectors. As used in this specification, the term scanner is functionally equivalent in meaning to deflector. The first four deflectors listed above are well known in the field, examples of later type of deflectors are disclosed in U.S. Pat. No. 4,236,784 of Palmer, U.S. Pat. No. 3,941,927 of Russell, and U.S. Patent of Ditzik, 1983. If the deflector is the type that will deflect the beam in only one direction (e.g., $\pm x$ direction) then two deflectors would be needed for x-y deflection.

After exiting the optical deflector 17, the beam enters a flat field scan lens 19, which consists of one or more specially designed optical components. An optical beam or light ray, entering the lens within a defined field angle, will be focused onto a flat image plane. The arrangement described above and shown in FIG. 1 is called pre-objective scanning. This provides a uniform linear scanning velocity for a constant velocity beam deflection (R. E. Hopkins and M. J. Buzawa, Optical Engineering, Vol. 15 No. 2, 1976). If a constant scan velocity is not obtained, the image on the target image surface (i.e., the focused beam) suffers from a spacing distortion across the scan length. Typically, the edges would appear spread out, while the center would appear squeezed together Flat field scan lenses can be obtained from GCA Corporation, Tropel Division or Milles Griot, Optical Systems Division. It is possible that additional distortions could be corrected by this lens. Specifically, image distortion caused by an inclined image surface could be corrected. The scanning optics in the invention may be either a post-objective or a pre-objective design.

If the deflector used has a lens preceding it, then the arrangement is post-objective scanning For example, a simple focusing lens may be placed in front of a rotating galvanometer-mirror deflector so that it is in the path of the converging beam. When the mirror is rotated, the focused image path is curved instead of flat in pre-objective scanning If the target surface is flat, the image spot will be out of focus at the ends of the scan. An advantage of post-objective scanning is the low cost of the optical system, but a disadvantage is the non-uniform focusing of the image For illustration purposes, three optical beam paths 21, 23 and 25 are shown exiting the flat field lens 19, in FIG. 1. Each beam path strikes a large surface mirror reflector 27 and is reflected toward a display panel screen 39. The rear side of the display panel is the image surface (i.e., surface of image focus). As shown in FIG. 1, the display panel is inclined near the horizontal. The inclined angle is defined as the angle from the display screen plane to the horizontal plane. In this embodiment, the inclined angle typically should be between 20 and 45 degrees. The optical path 25, represents a zero deflection path, and paths 21 and 23 represent typical $\pm$-angular deflections. The display panel has an electrooptic material 29 and 37 sandwiched or placed between front substrates 31 and rear substrate 33. The perimeter of the panel is sealed by the edge sealer 35. The gap between the substrates is typically 10 micrometer and substrate 31 must be transparent, in order for the optical state of the electrooptic material to be viewable.

Figure 2:
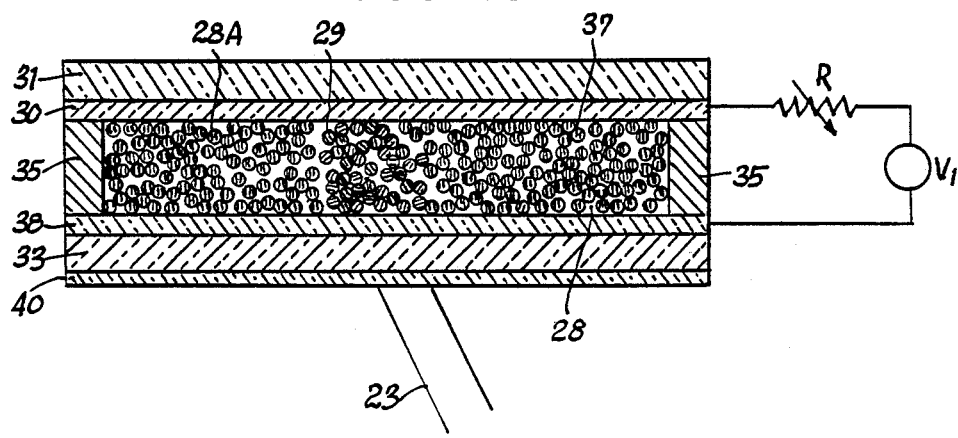
FIG. 2 is a detailed edge view of the electrooptic display panel showing the elements of the panel.

The display panel of FIG. 1 is presented in greater detail in FIG. 2, where the later figure is also not to scale. On the inside surfaces of substrates 31 and 33 is a thin layer of transparent conductive material, which form the front substrate electrode 30 and rear substrate electrode 38, respectively. The conductive coating typically is an indium-tin oxide material that is vacuum deposited or RF-sputtered onto the substrate and is usually about 1000 Angstroms thick. The substrates may also be comprised of a flexible material, such as a polymer film or sheet. If the substrates are thin and flexible, the electrodes and panel fabrication method may be a continuous roll-to-roll process. The advantage of the roll-to-roll process is the possibility of a lower overall fabrication cost In the preferred embodiment, the electrooptic material may be a liquid crystal (LC) material, which can be place between the substrates in either bulk form or encapsulated in a polymer material. A dye material may be mixed with the LC to form a guest-host mixture that changes color with molecular orientation. In addition, several types of LC materials may mixed together for improved electrooptic performance. The conventional LC panel structure comprises of the LC mixture in bulk form sandwiched between transparent substrates electrodes along with small transparent fibers or spheres used as spacers. An alternate panel structure, shown in FIG. 2, will have the LC mixture microencapsulated in a transparent solid polymer or other relatively solid transparent micro-porous material 28. The LC mixture will reside inside the micro-capsules or micro-pores 28A. The polymer material will act as a spacer between the substrate electrodes. Two stable phases of the LC mixture is shown in schematic form by short dashes, representing the LC director unit vectors. The ordered state or homeotropic orientation is indicated by 37 and scattered state by 29. Without any dye added to mixture, the ordered state appears clear and the scattered state appears cloudy or white. The phase or optical state of the LC mixture is changed by (1) the laser beam 23 impinging on substrate 38, and (2) the proper voltage $V_1$ applied to the substrate electrodes 30 and 38.

The LC mixture can be the type that is temperature sensitive or an one that responds to an electric field. Smectic A type LC materials are available that, when properly aligned, will change into an isotropic phase upon application of a low power laser beam (21, 25 or 23) due to the heat generated by the beam (F. Kahn, Appl. Phys. Lett., Vol. 3(1), February, 1973). This phase change will be localized around a small volume where the laser beam impinges onto the LC panel, see FIGS. 1 and 2. When the laser beam is switched off or scanned to another location, the localized LC volume will cool down and freeze into a scattered orientation 29. The written (scattered) spot diameter would be slightly larger than the laser beam diameter. This small volume will scatter light or change color and will be readily visible to the naked eye. The change in the LC phase is said to be accompanied by a change in optical state. This particular LC is called electric-thermo-optic and is known to those skilled in the art. By controlling the laser beam intensity, beam deflection, and the voltage across the panel, $V_1$, selective write/erase, display memory, and bulk erase display functions are obtained.

The LC material may also be a field effect type of material. In this type LC material, the molecular phase is changed by the application of an electric field. The phase change can be accomplished if the back surface of the rear substrate 33 is coated with a thin layer of a photoconductor material 40. The electrical properties of a photoconductor changes when exposed to light. A light beam impinging on the photoconductor 40, will cause the electrical resistance to become an order of magnitude less in the local area where the beam impinges, reference Samuelson, Wieder, Guannieri, Chavallier, and Onton (Appl. Phys. Lett., Vol. 34(7), Apr. 1, 1979); and Ditzik, 1983. If Voltage $V_1$ is applied across the entire anode-LC-photoconductor-cathode sandwich (FIG. 2), the reduction of the photoconductor resistance will cause a large increase in electric field, at the immediate area surrounding the area impinged by the light beam.

A preferred LC material is one that has an inherently fast phase or optical state response. A smectic LC material that has been surface stabilized is capable of submicrosecond bi-stable electrooptic switching, reference N. A. Clark and Sven Lagerwall (Appl. Phys. Lett., Vol. 36(11), June, 1980). Typically, smectic C liquid crystals in thick layers have a molecular orientation is helical in structure. If the substrate electrodes are properly treated and placed between two flat substrates in a thin layer, typically 1 $\mu$m, the helical orientation is suppressed. This condition is called surface stabilized, and it results in a fast switching smectic C LC display panel. The ferroelectric smectic C LC is unique by having stable polarization vector orientations that can be spontaneously switched back and forth, by application of an electric field. The two polarization states can be viewed by placing the panel between crossed polarizers.

Several first generation Shiff-based ferroelectric smectic C LC compounds have been reported, which are capable of being surface stabilized and spontaneously switchable between bi-stable states. Examples of such compounds include: 4-n-decyloxy-benzyllidene-4'-anino- ( 2-methylybutyl) Cinnamate (DOBAMBC) and 4-p-hexyloxy-benzylidene-p'-amino-chloropropyl cinnamate (HOBACPA). However, in order for these compounds to be usable in display applications, the material must have several properties. The material should have good switching properties over a wide temperature range, operate near room temperature, have stable and ordered phase orientations, have low viscosity, and have a long helical pitch. Typically, the first generation ferroelectric smectic C LC compounds have one or more deficiencies in the above properties. Therefore, two or more compounds are often mixed together to form a suitable eutectic ferroelectric smectic C LC mixture, which result in improved properties over a single component material. The above is well known to those skilled in the art. Examples of commercially available ferroelectric Smectic C LC mixtures include CS-1011 from Chisso Inc., ZLI-3488 from E. Merck Limited, and SCE-4 from BDH Limited.

Referring to FIG. 1 again, the active display screen area 39 is slightly smaller than the display panel, where the screen is surrounded by a narrow border 41. The laser beam is capable of being deflected anywhere in the screen area (e.g., the deflected beam paths 21, 23 or 25). Placed directly on top of the display screen is a transparent graphic tablet 43 shown in an exploded view. The graphic tablet encodes the position of a stylus 49 (shown in FIG. 3 but not in FIG. 1), when placed on or near the tablet surface. The graphic tablet surface is defined as a surface area where the measurement of stylus x-y position takes place. The graphic tablet surface is typically made of a transparent linear conductive film. The surface is electrically connected to the electrical control means 12. A linear conductive film is a thin layer of material where the surface resistivity varies linearly across the surface. The stylus is a narrow instrument with a pointed end, such as a pen or other type of writing instrument. For certain types of graphic tablets, the stylus may be defined as a finger of a person touching the tablet surface. Data from the graphic tablet 43 is sent to the electrical control means 12 where it is either sent to the optical beam deflector 17 and to an external communications means 44. As shown in FIG. 1, the graphic tablet 43 rests on top of the display screen 39 and both are oriented at an inclined angle with respect to the horizontal plane. A keyboard means 47 can be electrically connected to the electrical control means 12, to provide for alphanumeric and symbolic data input to the display-tablet unit.

The display-tablet and keyboard units can be connected to an ordinary telephone hookup arrangement, which would allow for both graphics and voice communications. One possible embodiment of the invention would be to connect an ordinary telephone hookup means 45 to the external communication means 44, as shown in FIG. 1. The telephone could be a conventional type or a speaker-phone type. The external communication means is connected to the electrical control means 12. The external communication means would normally provide the signal multiplexing and/or de-multiplexing necessary for external communications to and from remote devices 62, such as a computer or another display-tablet unit.

A perspective view of the graphic display-tablet and keyboard is shown in FIG. 3, with a person operating the system. The display-tablet unit enclosure 51 contains the optical and electrical components, shown in FIG. 1, except for the keyboard. The person or user 46 who is operating system is shown writing, sketching or drawing on the electronic tablet and screen area (43, 39) with a hand-held stylus, 49. In the view of FIG. 3, the display screen 39 and graphic tablet 43 are viewed as indistinguishable from each other, since each is comprised of a thin transparent surface placed one on top of the other. The stylus 49 is active, which means the stylus sends or receives an electrical signal to/from the graphic tablet. In some graphic tablet devices, a passive stylus could be used, i.e., a stylus without a wire connected. Since the tablet and screen combination (43 and 39) is inclined near the horizontal, the user 46, can write onto the surface, resulting in an unexpectedly synergistic operation.

A conventional detachable keyboard means 47 can be connected to the display-tablet unit. The user 46 can, therefore, type alphanumeric data on the keyboard for entry into the display-tablet system for either display on the screen or transmission external from the system.

The display screen is capable of presenting alphanumeric and/or graphic data from data received from the external communication means. The above can be considered a graphics communication operation. Graphic information is defined to include alphanumeric text, symbols, pictures, drawings, or sketches that has either been generated by the user at the graphic tablet or generated by coded data from the control means. The display-tablet unit is capable of displaying handwritten graphics from the graphic tablet, alphanumeric data from the keyboard, or data received from an external data source. Both internally-echoed data and externally-received data can be displayed at the same time, but cannot be written at the same time, unless there existed two separately controlled optical beams. Another embodiment of the invention is a display-tablet unit having two optical beams independently controlled in modulation and deflection. Data from the user could be echoed to the screen at the same time as other data received from an external data source is displayed, thus defining full duplex communications.

In order for the display device to be useful in a wide range of applications, a selective erase function should be implemented. Several techniques have been reported in the prior art to accomplish selective erase (e.g., Kahn, 1972). Selective erase is the capability to erase or remove a defined area on a screen of previously written data, without effecting the surrounding area on the screen. As shown in FIG. 3, a selective erase switch 55, is provided to activate this capability. The cursor position on the screen or the stylus position on the tablet would select the specific area to be erased. A full screen erase function is also implemented by a full screen erase switch 57. Since a microprocessor may control the operation of the display-tablet system, a reset switch 53 may be included. These switches, along with an on-off switch, 59, are placed above the screen so that they are not inadvertently switched during the handwriting/sketching operation by the user.

The foregoing descriptions are intended merely to illustrate embodiments of the inventions claimed hereinafter and no unnecessary limitations should be devised therefrom.

I claim:

1. An apparatus for communicating graphic information which comprises:
    a direct-view electrooptic display device defining an electrooptic display panel and optical beam source, wherein the electrooptic display panel acts as a display screen and the electrooptic display panel is oriented at an inclined angle near the horizontal;
    a transparent graphic tablet having a writing surface of approximately equivalent size as the electrooptic display panel, wherein the graphic tablet is mounted above and roughly parallel to the electrooptic display panel, on which hand scribed information is encoded into electrical signals;
    means for external data communication to and from the apparatus wherein the communication means transmits data via electrical signals to and from remote devices;
    means for keyboard entry of text information to the apparatus, wherein the data from the keyboard means can be displayed on the electrooptic display device; and
    means for electrically controlling the electrooptic display device, the graphic tablet, the keyboard means and the data communication means by direct electrical connection, wherein the control means by direct electrical connection, wherein the control means generates control signals to operate the display device, graphic tablet, keyboard means, and data communication means.

2. An apparatus as recited in claim 1 further comprising a means for ordinary telephone hookup, wherein an external data communication means is electrically connected to the telephone hookup means, and wherein graphic and voice data can be transmitted by ordinary telephone means.

3. An apparatus as recited in claim 1 further comprising a means for ordinary telephone hookup, wherein an external data communication means is electrically connected to the telephone hookup means, and wherein graphic and voice data can be transmitted by ordinary telephone means.

4. An apparatus as recited in claim 1, in which the electrical control means further comprises a selective erase, full screen erase, and power on-off functions.

5. An apparatus as recited in claim 1, in which the direct-view electrooptic display comprises two optical sources that are individually controlled by electrical control signals from the electrical control means, wherein one beam contains data from the graphic tablet and the other beam contains data received from the external data communications means, wherein the apparatus is capable of full duplex communications.

6. An electrooptic display device which comprises:
    an laser assembly defining a narrow optical beam, wherein intensity of the optical beam is controlled by electrical signals, and wherein the laser assembly is fixed at a position such that the path of the beam oriented is at an oblique angle below the horizontal;
    means for deflecting the optical beam from the laser assembly, wherein that the optical beam is deflected through a multiplicity of angles at a sufficiently high rate to form text and graphics;
    an electrooptic display panel having electrooptic material between substrate electrodes, which is oriented at an inclined angle near the horizontal and wherein the optical beam impinges onto the electrooptic material locally where the beam impinges; and
    means for electrical control of the electrooptic display device, wherein the control means generates control signals which are electrically conducted to the laser assembly, to the optical deflection means and to the electrooptic display panel, via electrical cables.

7. An electrooptic display device as recited in claim 6 further comprising:
    a projection lens placed in the optical beam path wherein the optical beam is focused at the electrooptic display panel;
    an optical beam character generator centered on the optical beam path from the laser assembly, wherein the optical beam is cross-sectionally shaped into characters and symbols, and wherein the generator is controlled by signals from the electrical control means;
    a reflection mirror surface which reflects the optical beam received from the optical beam reflection means to the electrooptic panel.

8. An electrooptic display device as recited in claim 7, in which the projection lens is placed between the optical source and the optical beam deflector defining a post objective scanning arrangement.

9. An electrooptic display device as recited in claim 7, in which the projection lens is placed in the optical beam path after the optical beam deflecting means, wherein the projection lens is also a flat field type lens, and wherein the optical beam is focused over the flat surface of the display panel and is corrected for image distortions resulting from the folded optics and the inclined angle of the display panel.

10. An electrooptic display device as recited in claim 6, in which the electrooptic display panel comprises a smectic liquid crystal material mixture located between the substrates having electrodes such that the mixture changes optical state locally due to the application of heat from the optical beam.

11. An electrooptic display device as recited in claim 6, in which the electrooptic display panel comprises an electrooptic material that changes optical state by application of an electrical field, wherein the electric field is applied locally by the application of the optical beam impinging onto a photoconductor deposited onto one of the electrooptic display panel substrates.

12. An electrooptic display device as recited in claim 6, in which the laser assembly comprises a multiplicity of lasers, wherein the optical beams are individually controlled and projected onto the electrooptic display panel.

13. An electrooptic display device as recited in claim 6, in which the laser assembly is comprised of a plurality of lasers, wherein the optical beams are combined into a single beam and projected onto the electrooptic display panel.

14. An electrooptic display device as recited in claim 6, in which the electrooptic display panel has the electrooptic material micro-encapsulated in a transparent polymer material placed between the substrate having electrodes.

15. An electrooptic display device as recited in claim 6, in which the electrooptic display panel has the electrooptic material place in a multiplicity of micro-pores of a transparent micro-porous material that is placed between the substrates having electrodes.

16. An electrooptic display device as recited in claim 6, in which the electrooptic display panel is made with flexible substrate sheets, wherein the electrooptic display panel can be fabricated using a roll-to-roll means.

17. An electrooptic display device as recited in claim 6, in which the electrooptic material between the substrates having electrodes is a ferroelectric smectic C type liquid crystal mixture that has been ordered and surface stabilized.

18. An electrooptic display device as recited in claim 6, in which the electrical control means further comprises a selective erase, full screen erase, and power on-off functions.

19. A display tablet apparatus which comprises:
   a laser assembly defining a optical beam of energy emitted along a fixed optical path oriented at a downward slope at an oblique angle to the horizontal;
   an optical beam deflector centered on the optical path of the laser assembly, wherein the optical beam is deflected through a multiplicity of angles under electrical control;
   a reflective mirror surface oriented roughly horizontal and below the optical beam deflector, wherein the deflected optical beam from the optical beam deflector is reflected in an upward direction;
   a direct view electrooptic display panel inclined near the horizontal and above the reflective mirror surface, on which the optical beam from the reflective mirror surfaces impinges, wherein the electrooptic display panel changes optical state locally were the beam impinges;
   a transparent graphic tablet having a writing surface of approximately equivalent size as the electrooptic display panel, wherein the graphic tablet is mounted above and roughly parallel to the electrooptic display panel, on which hand scribed information is encoded into electrical signals;
   means for external data communications to and from the display-tablet apparatus, wherein the communication means transmits data via electrical signals to and from remote devices; and
   means for electrically controlling the laser assembly, the optical beam deflector, the electrooptic display panel, the graphic tablet and the external communication means by electrical conduction of control signals via electrical cables.

20. A display-tablet apparatus as recited in claim 19, which is further comprised of a keyboard, electrically connected to the control means, wherein a person can enter character and symbolic data to the display-tablet apparatus.

* * * * *

UNITED STATES PATENT AND TRADEMARK OFFICE
CERTIFICATE OF CORRECTION

PATENT NO.    : 4,911,536

DATED         : March 27, 1990

INVENTOR(S)   : Richard J. Ditzik

It is certified that error appears in the above-identified patent and that said Letters Patent is hereby corrected as shown below:

In Claim 14, line 39, the word "substrate" should be replaced with the word "substrates".

Signed and Sealed this

Sixteenth Day of April, 1991

Attest:

HARRY F. MANBECK, JR.

Attesting Officer

Commissioner of Patents and Trademarks